US007853928B2

(12) United States Patent
Attinella

(10) Patent No.: US 7,853,928 B2
(45) Date of Patent: Dec. 14, 2010

(54) CREATING A PHYSICAL TRACE FROM A VIRTUAL TRACE

(75) Inventor: John Eric Attinella, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 11/737,201

(22) Filed: Apr. 19, 2007

(65) Prior Publication Data

US 2008/0263309 A1    Oct. 23, 2008

(51) Int. Cl.
*G06F 9/44* (2006.01)
(52) U.S. Cl. ............... 717/128; 714/45; 714/E11.179; 714/E11.181
(58) Field of Classification Search ............ 711/173
See application file for complete search history.

(56) References Cited

U.S. PATENT DOCUMENTS

| 5,168,554 | A * | 12/1992 | Luke .................... 715/209 |
| 6,075,938 | A * | 6/2000 | Bugnion et al. ............ 703/27 |
| 6,397,242 | B1 * | 5/2002 | Devine et al. ............ 718/1 |
| 6,836,855 | B2 * | 12/2004 | Arndt .................... 714/9 |
| 2002/0120815 | A1 * | 8/2002 | Zahavi et al. ........... 711/118 |
| 2005/0080982 | A1 * | 4/2005 | Vasilevsky et al. ....... 711/1 |
| 2005/0120160 | A1 * | 6/2005 | Plouffe et al. .......... 711/1 |
| 2005/0278574 | A1 * | 12/2005 | Kitamorn et al. ......... 714/34 |
| 2006/0069938 | A1 * | 3/2006 | Olszewski et al. ........ 713/340 |
| 2006/0200643 | A1 * | 9/2006 | Tomita .................. 711/173 |
| 2007/0234016 | A1 * | 10/2007 | Davis et al. ............ 712/227 |

OTHER PUBLICATIONS

What is a logical partition?; WhatIs.com; Nov. 3, 2005.*
Trace Factory: Generating Workloads for Trace-Driven Simulation of Shared-Bus Multiprocessors; Giorgi et al.; IEEE Concurrency, vol. 5 No. 4; Oct. 1997-Dec. 1997.*
Trace-Driven Memory Simulation: A Survey; Uhlig et al.; ACM Computing Surveys, vol. 29 No. 2; Jun. 1997.*
Determining Possible Event Orders by Analyzing Sequential Traces; Helmbold et al.; IEEE Transactions on Parallel and Distributed Systems; vol. 4 No. 7; Jul. 1993.*

* cited by examiner

*Primary Examiner*—Tuan V Thai
*Assistant Examiner*—Daniel Chappell
(74) *Attorney, Agent, or Firm*—Owen J. Gamon

(57) ABSTRACT

In an embodiment, virtual trace records are read and physical trace records are created and displayed. The virtual trace records are associated with virtual processors allocated to logical partitions in a logically-partitioned computer system. Each of the virtual trace records has a wait timestamp, specifying a time at which a virtual processor began waiting to be dispatched and a wait time delta, specifying an amount of time that the virtual processor waited to be dispatched. An execute timestamp is created in each of the virtual trace records, which specifies a time at which the virtual processor was dispatched. The virtual trace records are sorted for each of the virtual processors by the execute timestamp. Physical trace records are created based on the sorted virtual trace records. Each physical trace record describes a dispatch of one of the virtual processors to one of the physical processors.

6 Claims, 7 Drawing Sheets

VIRTUAL TRACE LOG CONVERTER BUFFER
(DATA FROM VIRTUAL PROCESSOR A FOR PARTITION A) 206-1

| EXECUTE TIME STAMP (324) | PHYSICAL PROC ID (326) | WAIT TIMESTAMP (328) | WAIT DELTA (330) | DISPATCH REASON (332) | |
|---|---|---|---|---|---|
| 12301000 | A | 12300000 | 1000 | PREEMPT | 302 |
| 12305030 | B | 12303000 | 2030 | TIMEOUT | 304 |
| 12306050 | A | 12306000 | 50 | EXTERNAL INTERRUPT | 306 |
| 12308020 | A | 12307000 | 1020 | LPPROD | 308 |
| | | 1231000 | | | 310 |

FIG. 3A

VIRTUAL TRACE LOG CONVERTER BUFFER
(DATA FROM VIRTUAL PROCESSOR B FOR PARTITION A) 206-2

| EXECUTE TIME STAMP (324) | PHYSICAL PROC ID (326) | WAIT TIMESTAMP (328) | WAIT DELTA (330) | DISPATCH REASON (332) | |
|---|---|---|---|---|---|
| 12302000 | B | 1230000 | 2000 | TIMEOUT | 340 |
| 12304110 | A | 12303000 | 1110 | EXTERNAL INTERRUPT | 342 |
| 12307140 | B | 12305000 | 2140 | LPPROD | 344 |
| 12310020 | A | 12309000 | 1020 | PREEMPT | 346 |
| | | 12312010 | | | 348 |

FIG. 3B

VIRTUAL TRACE LOG CONVERTER BUFFER
(DATA FROM VIRTUAL PROCESSOR C FOR PARTITION B) 206-3

| EXECUTE TIME STAMP | PHYSICAL PROC ID | WAIT TIMESTAMP | WAIT DELTA | DISPATCH REASON | |
|---|---|---|---|---|---|
| 12303020 | B | 12301000 | 2020 | EXTERNAL INTERRUPT | 350 |
| 12306030 | B | 12305020 | 1010 | LPPROD | 352 |
| 12307110 | A | 12307100 | 10 | PREEMPT | 354 |
| 12311020 | B | 12308000 | 3020 | TIMEOUT | 356 |
| | | 12313000 | | | 358 |

FIG. 3C

VIRTUAL TRACE LOG CONVERTER BUFFER
(DATA FROM VIRTUAL PROCESSOR D FOR PARTITION B) 206-4

| EXECUTE TIME STAMP | PHYSICAL PROC ID | WAIT TIMESTAMP | WAIT DELTA | DISPATCH REASON | |
|---|---|---|---|---|---|
| 12303010 | A | 12302200 | 810 | LPPROD | 370 |
| 12305020 | A | 12304010 | 1010 | PREEMPT | 372 |
| 12309010 | B | 12306020 | 2990 | TIMEOUT | 374 |
| 12313030 | B | 12311000 | 2030 | EXTERNAL INTERRUPT | 376 |
| | | 12315000 | | | 380 |

FIG. 3D

| | | | PHYSICAL TRACE LOG (FOR PHYSICAL PROCESSOR A) | | | 138-1 |
|---|---|---|---|---|---|---|
| START TIME STAMP | PARTITION ID | VIRTUAL PROC ID | DISPATCH REASON | VIRTUAL PROC TIME | LATENCY | |
| 12301000 | A | A | PREEMPT | 2000 | 10 | 402 |
| 12303010 | B | D | LPPROD | 1000 | 100 | 404 |
| 12304110 | A | A | EXTERNAL INTERRUPT | 990 | 20 | 406 |
| 12305020 | B | D | PREEMPT | 1000 | 30 | 408 |
| 12306050 | A | A | EXTERNAL INTERRUPT | 950 | 110 | 410 |
| 12307110 | B | A | PREEMPT | 890 | 20 | 412 |
| 12308020 | A | A | LPPROD | 1980 | 200 | 414 |
| 12310020 | A | B | PREEMPT | 1990 | | 416 |

FIG. 4A

| | | | PHYSICAL TRACE LOG (FOR PHYSICAL PROCESSOR B) | | | 138-2 |
|---|---|---|---|---|---|---|
| START TIME STAMP | PARTITION ID | VIRTUAL PROC ID | DISPATCH REASON | VIRTUAL PROC TIME | LATENCY | |
| 12302000 | A | B | TIMEOUT | 1000 | 20 | 450 |
| 12303020 | B | C | EXTERNAL INTERRUPT | 2000 | 10 | 452 |
| 12305030 | A | A | TIMEOUT | 970 | 30 | 454 |
| 12306030 | B | C | LPPROD | 1070 | 40 | 456 |
| 12307140 | A | B | LPPROD | 1860 | 10 | 458 |
| 12309010 | B | D | TIMEOUT | 1990 | 20 | 460 |
| 12311020 | B | C | TIMEOUT | 1980 | 30 | 462 |
| 12313030 | B | D | EXTERNAL INTERRUPT | 1970 | | 464 |

FIG. 4B

CREATING A PHYSICAL TRACE FROM A VIRTUAL TRACE

FIELD

This invention generally relates to computer systems and more specifically relates to creating a trace of physical processors from a trace of virtual processors in a logically-partitioned computer system.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago. One significant advance in computer technology is the development of parallel processing, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads, so that multiple tasks can essentially be performed at the same time.

In addition, some computers implement the concept of logical partitioning, where a single physical computer is permitted to operate essentially like multiple and independent virtual computers, referred to as logical partitions, with the various resources in the physical computer (e.g., processors, memory, and input/output devices) allocated among the various logical partitions via a partition manager, or hypervisor. Each logical partition executes a separate operating system, and from the perspective of users and the software applications executing in the logical partition, operates as a fully independent computer.

One way that physical resources are allocated to, and shared among, the logical partitions is through a concept known as virtual resources. For example, a virtual processor may be allocated to a logical partition. From the perspective of the logical partition, it has complete access to its virtual processor and may execute its operating system and applications on its virtual processor, at its discretion. But, unbeknownst to the logical partition, its virtual processor is actually implemented as fractional allocations of time slices of one or more physical processors, and these fractional allocations and physical processors may change over time.

When logical partitions share fractional portions of the available physical processors, the manner in which physical processors are allocated across the logical partitions can affect the performance of each logical partition. The operating systems that run within the logical partitions often provide tools to analyze the performance of their logical partition, but the analysis solely from the logical partition perspective is insufficient to understand the dynamics of the allocation of the physical processors across multiple logical partitions. Thus, analyzing the performance of a logically-partitioned computer system can be difficult because the performance data that is collected is organized and described in terms of the virtual processors. Current techniques attempt to address the aforementioned problems by adding additional instrumentation and data gathering to the underlying firmware and/or hardware of the logically-partitioned computer system, but these techniques can be costly and often degrade the overall performance of the computer system.

Hence, without a better technique for collecting performance data in logically-partition computer systems, users will continue to experience difficulty in performing performance analysis.

SUMMARY

A method, apparatus, storage medium, and computer system are provided. In an embodiment, virtual trace records are read and physical trace records are created. The virtual trace records are associated with virtual processors allocated to logical partitions in a logically-partitioned computer system. Each of the virtual trace records has an identifier of the physical processor to which the virtual processor was dispatched, a dispatch reason that caused the virtual processor to be dispatched, a wait timestamp that specifies a time at which the virtual processor began waiting to be dispatched, and a wait time delta that specifies an amount of time that the virtual processor waited to be dispatched. An execute timestamp is created in each of the virtual trace records, which is a sum of the wait timestamp and the wait time delta from the virtual trace record. The virtual trace records are sorted for each of the virtual processors by the execute timestamp.

Physical trace records associated with the physical processors are created and displayed. Each of the physical trace records describes a dispatch of one of the virtual processors to one of the physical processors. A partition identifier is created in each of the physical trace records, which identifies the logical partition to which the virtual processor was allocated. A start timestamp in each of the physical trace records is created, which is a sum of the wait timestamp and the wait time delta from a corresponding virtual trace record. A virtual processor identifier is created in each of the physical trace records, which identifies the virtual processor that was dispatched at the time of the start timestamp. A virtual processing time is created in each of the physical trace records, which is the wait timestamp of a next virtual trace record (the next virtual trace record following the current virtual trace record in time, where the current virtual trace record corresponds to a current physical trace record) minus the start timestamp of the current physical trace record. A latency time is created in each of the trace records, which is the next start timestamp in a next physical trace record minus the start timestamp of the current physical trace record minus the current virtual processing time. In this way, physical trace records present the data in a form that eases performance analysis for a logically-partitioned computer system.

BRIEF DESCRIPTION OF THE DRAWINGS

Various embodiments of the present invention are hereinafter described in conjunction with the appended drawings:

FIG. 3A depicts a block diagram of an example virtual trace log, according to an embodiment of the invention.

FIG. 3B depicts a block diagram of another example virtual trace log, according to an embodiment of the invention.

FIG. 3C depicts a block diagram of another example virtual trace log, according to an embodiment of the invention.

FIG. 3D depicts a block diagram of another example virtual trace log, according to an embodiment of the invention.

FIG. 4A depicts a block diagram of an example physical trace log, according to an embodiment of the invention.

FIG. 4B depicts a block diagram of another example physical trace log, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
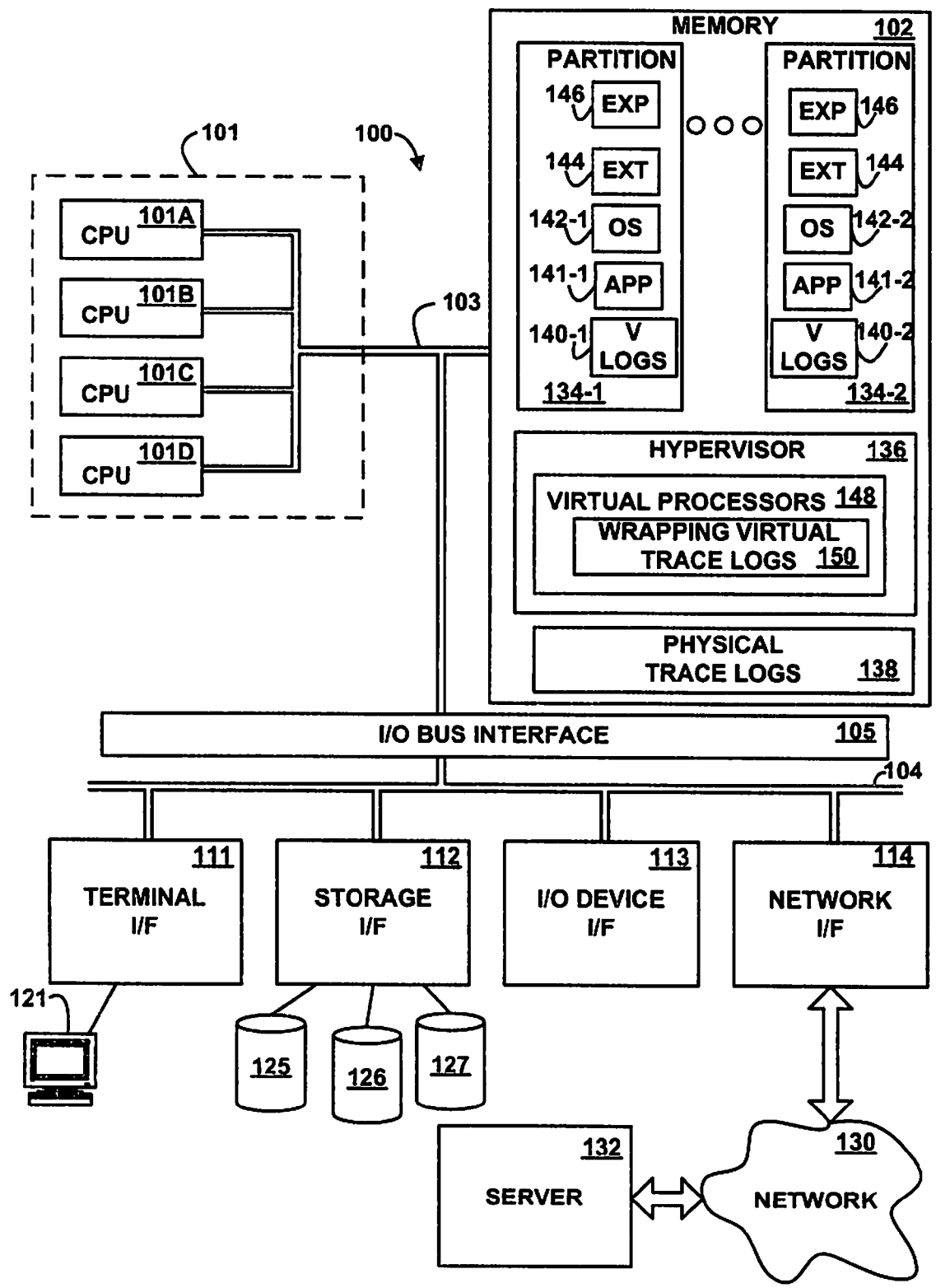
FIG. 1 depicts a high-level block diagram of an example system for implementing an embodiment of the invention.

Referring to the Drawings, wherein like numbers denote like parts throughout the several views, FIG. 1 depicts a high-level block diagram representation of a logically-partitioned computer system 100 connected via a network 130 to a server computer system 132, according to an embodiment of the present invention. The designation "server" is used for convenience only, and, in an embodiment, a computer that operates as a client to one computer may operate as server to another computer, and vice versa. In an embodiment, certain hardware components of the computer system 100 may be implemented by an IBM ESERVER POWER 5 computer system. However, those skilled in the art will appreciate that the mechanisms and apparatus of embodiments of the present invention apply equally to any appropriate computing system.

The major components of the computer system 100 include one or more physical processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the physical processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as containing the primary software components and resources utilized in implementing a logically partitioned computing environment on the computer 100, including a plurality of logical partitions 134-1 and 134-2 managed by a partition manager or hypervisor 136 and physical trace logs 138. The contents of the memory 102 are further described below with reference to FIG. 2.

Although the partitions 134-1 and 134-2, the hypervisor 136, and the physical trace logs 138 are illustrated as being contained within the memory 102 in the computer system 100, in other embodiments some or all of them may be on different computer systems, e.g., the server computer system 132, and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the partitions 134-1 and 134-2, the hypervisor 136, and the physical trace logs 138 are illustrated as residing in the memory 102, these elements are not necessarily all completely contained in the same storage device at the same time.

Each of the logical partitions 134-1 and 134-2 utilizes a respective operating system 142-1 and 142-2, which control the primary operations of their respective logical partition 134-1 and 134-2 in the same manner as the operating system of a non-partitioned computer. For example, each operating system 142-1 and 142-2 may be implemented using the I5OS operating system available from International Business Machines Corporation, but in other embodiments the operating systems 142-1 and 142-2 may be LINUX, AIX, UNIX, MICROSOFT WINDOWS, or any appropriate operating system. Also, some or all of the operating systems 142-1 and 142-2 may be the same or different from each other. Any number of logical partitions may be supported as is well known in the art, and the number of the logical partitions resident at any time in the computer 100 may change dynamically as partitions are added or removed from the computer 100.

Each of the logical partitions 134-1 and 134-2 executes in a separate, or independent, memory space within the memory 102, and thus each logical partition acts much the same as an independent, non-partitioned computer from the perspective of each application 141-1 and 141-2 that executes in each such respective logical partition. As such, user applications typically do not require any special configuration for use in a partitioned environment. Each of the applications 141-1 and 141-2 illustrated in FIG. 1 may be the same or some or all of them may be different from each other. Further, each of the partitions 134-1 and 134-2 may include multiple of the applications 141-1 and 141-2. The partitions 134-1 and 134-2 further include extractors 144, exporters 146, and respective virtual trace log exporter buffers 140-1 and 140-2.

The extractor 144 and the exporter 146 include instructions capable of executing on the processor 101 or statements capable of being interpreted by instructions executing on the processor 101 to perform the functions as further described below with reference to FIG. 5. In another embodiment, the extractor 144 and the exporter 146 may be implemented in microcode or firmware. In another embodiment, the extractor 144 and the exporter 146 may be implemented in hardware via logic gates and/or other appropriate hardware techniques.

Given the nature of the logical partitions 134-1 and 134-2 as separate virtual computers, it may be desirable to support inter-partition communication to permit the logical partitions 134-1 and 134-2 to communicate with one another as if the logical partitions 134-1 and 134-2 were on separate physical machines. As such, in some implementations it may be desirable to support an unillustrated virtual local area network (LAN) adapter associated with the hypervisor 136 to permit the logical partitions 134-1 and 134-2 to communicate with one another via a networking protocol such as the Ethernet protocol. In another embodiment, the virtual network adapter may bridge to a physical adapter, such as the network interface adapter 114. Other manners of supporting communication between partitions may also be supported consistent with embodiments of the invention.

Although the hypervisor 136 is illustrated as being within the memory 102, in other embodiments, all or a portion of the hypervisor 136 may be implemented in firmware or hardware. The hypervisor 136 may perform both low-level partition management functions, such as page table management and may also perform higher-level partition management functions, such as creating and deleting partitions, concurrent I/O maintenance, and allocating processors, memory and other hardware or software resources to the various partitions 134-1 and 134-2.

The hypervisor 136 statically and/or dynamically allocates to each logical partition 134-1 and 134-2 a portion of the available resources in computer 100. For example, each logical partition 134-1 and 134-2 may be allocated one or more of the physical processors 101 and/or one or more hardware threads, as well as a portion of the available memory space. The logical partitions 134-1 and 134-2 can share specific software and/or hardware resources, such as the processors 101, such that a given resource may be utilized by more than one logical partition. In the alternative, software and hardware resources can be allocated to only one logical partition at a time. The hypervisor 136 allocates the physical processors 101 to the partitions 134-1 and 134-2 via allocations of the virtual processors 148 to the partitions 134-1 and 134-2. The virtual processors 148 represent fractional allocations of time slices of physical processors 101A, 101B, 101C, and/or 101D, and the particular physical processor that is assigned or allocated to a particular virtual processor may vary over time. The virtual processors 148 include wrapping virtual trace logs 150, which include data regarding the allocation of the physical processors to the virtual processors that are allocated to the logical partitions 134-1 and 134-2.

Additional resources, e.g., mass storage, backup storage, user input, network connections, and the I/O adapters therefor, are typically allocated to one or more of the logical partitions 134-1 and 134-2. Resources may be allocated in a number of manners, e.g., on a bus-by-bus basis, or on a resource-by-resource basis, with multiple logical partitions sharing resources on the same bus. Some resources may even be allocated to multiple logical partitions at a time. The resources identified herein are examples only, and any appropriate resource capable of being allocated may be used.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology.

The I/O interface units support communication with a variety of storage and I/O devices. For example, the terminal interface unit 111 supports the attachment of one or more user terminals 121. In various embodiments, the user terminal 121 may include user output devices (such as a video display device, speaker, and/or television set) and user input devices (such as a keyboard, mouse, keypad, touchpad, trackball, buttons, light pen, or other pointing device). The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O device interface 113 provides an interface to any of various other input/output devices or devices of other types, such as a printer or fax machine, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the server 132. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

FIG. 1 is intended to depict the representative major components of the computer system 100, the network 130, and the server 132 (which may include any or all of the elements previously described above for the computer system 100) at a high level; individual components may have greater complexity than represented in FIG. 1; components other than or in addition to those shown in FIG. 1 may be present; and the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
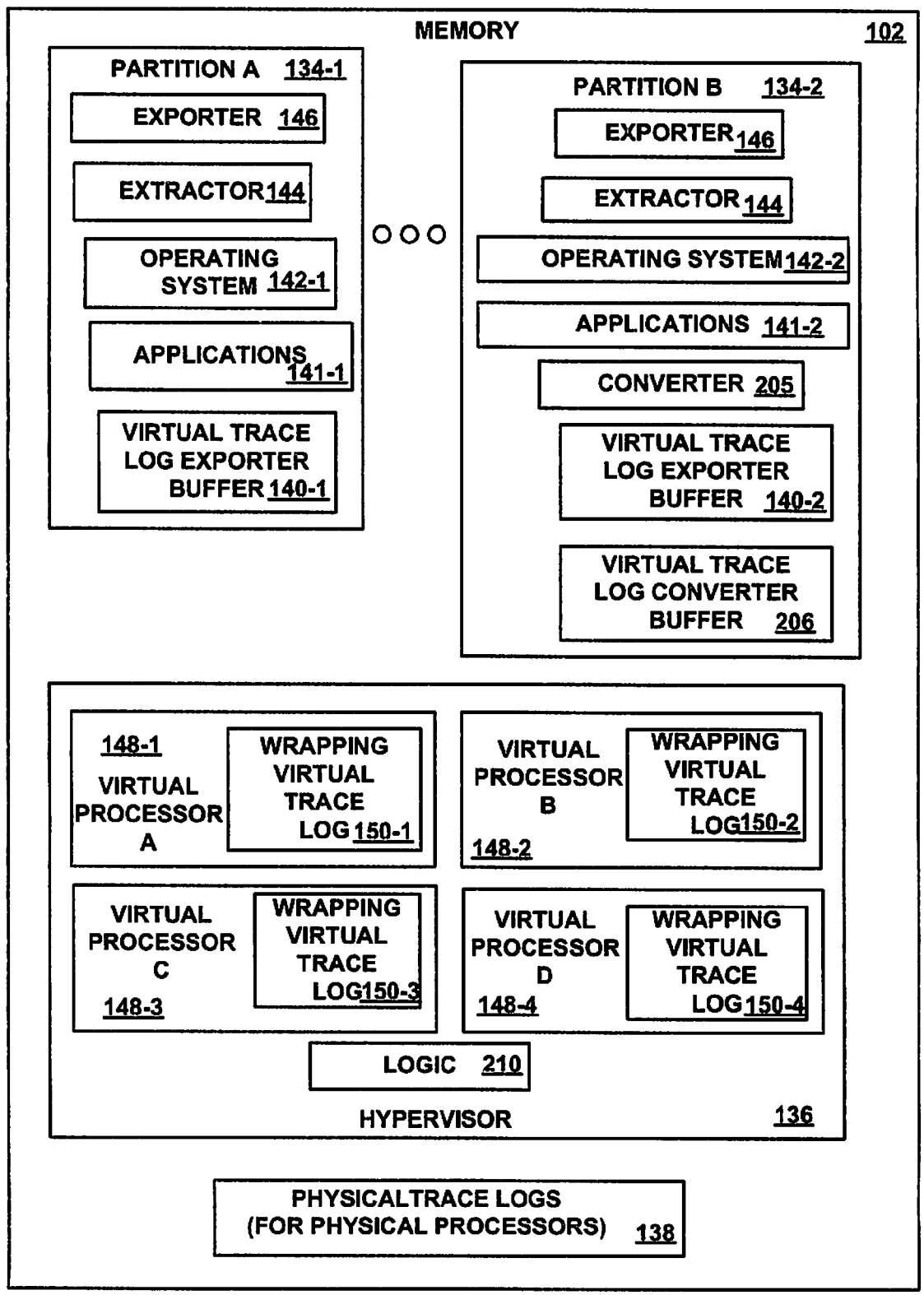
FIG. 2 depicts a block diagram of an example memory contents, according to an embodiment of the invention.

FIG. 2 depicts a block diagram of an example contents of the memory 102, according to an embodiment of the invention. The memory 102 includes the logical partitions 134-1 and 134-2, the hypervisor 136, and the physical logs 138. The logical partition 134-1 includes a virtual trace log exporter buffer 140-1, applications 141-1, an operating system 142-1, an extractor 144, and an exporter 146. The logical partition 134-2 includes a virtual trace log exporter buffer 140-2, applications 141-2, an operating system 142-2, an extractor 144, an exporter 146, a converter 205, and a virtual trace log converter buffer 206. In other embodiments, the converter 205 and the virtual trace log converter buffer 206 may be present in any logical partition, may be part of the hypervisor 136, or may be separate entities. The converter 205 includes instructions capable of executing on the processor 101 or statements capable of being interpreted by instructions executing on the processor 101 to perform the functions as further described below with reference to FIG. 6. In another embodiment, the converter 205 may be implemented in microcode or firmware. In another embodiment, the converter 205 may be implemented in hardware via logic gates and/or other appropriate hardware techniques.

The hypervisor 136 includes virtual processors 148-1, 148-2, 148-3, and 148-4. Each virtual processor includes a respective wrapping virtual trace log 150-1, 150-2, 150-3, and 150-4. The hypervisor 136 further includes logic 210. The logic 210 includes instructions capable of executing on the processor 101 or statements capable of being interpreted by instructions executing on the processor 101 to perform the functions as further described below with reference to FIG. 5. In another embodiment, the logic 210 may be implemented in microcode or firmware. In another embodiment, the logic 210 may be implemented in hardware via logic gates and/or other appropriate hardware techniques.

A particular virtual processor is allocated to a particular logical partition, so that from the perspective of the logical partition, the logical partition has exclusive use of its dedicated virtual processors, the programs of the partition execute on the virtual processors, and the virtual processors are not shared with other logical partitions. But, a virtual processor actually represent fractional allocations of time slices of one or more physical processors, and these fractional allocations of physical processors to virtual processors may change over time. The hypervisor 136 allocates the virtual processors to the partitions and dispatches the virtual processors to the physical processors 101A, 101B, 101C, and 101D. The hypervisor 136 may change the allocation of physical processors to virtual processors over time. As the hypervisor 136 allocates the virtual processors and dispatches the virtual processors to the physical processors, the hypervisor 136 writes data to the respective wrapping virtual trace logs that describes the allocations and dispatches.

FIG. 3A depicts a block diagram of an example virtual trace log converter buffer 206-1, according to an embodiment of the invention. The virtual trace log converter buffer 206-1 is associated with the virtual processor 148-1, meaning that the virtual trace log converter buffer 206-1 includes an amalgamation of records that were copied from the wrapping virtual trace log 150-1 associated with the same virtual processor 148-1 by way of the virtual trace log exporter buffer 140-1. The virtual trace log converter buffer 206-1 is allocated to the partition 134-1, meaning that the virtual trace log converter buffer 206-1 includes records that describe the allocation of physical processor(s) 101 to the virtual processor 148-1, which is allocated to the partition 134-1 and on which the programs of the partition 134-1 execute. The virtual trace log converter buffer 206-1 is an example of the virtual trace log converter buffer 206. The virtual trace log converter buffer 206-1 includes example records 302, 304, 306, 308, and 310, each of which includes an example execute timestamp field 324, a physical processor identifier field 326, a wait timestamp field 328, a wait time delta field 330, and a dispatch reason field 332.

The execute timestamp field 324 in the virtual trace log converter buffer 206-1 specifies the beginning time at which the virtual processor 148-1 was allocated a physical processor (by the hypervisor 136), i.e., the virtual processor 148-1 was dispatched to the physical processor, and the programs (e.g., the exporter 146, extractor 144, the operating system 142-1, and/or applications 141-1) of the logical partition 134-1 began executing on the virtual processor 148-1, i.e., the programs began executing on the physical processor 326 that was allocated to the virtual processor 148-1. In each record, the execute timestamp field 324 includes the sum of the contents of the wait timestamp field 328 and the contents of the wait time delta field 330 for the same record.

The physical processor identifier field 326 in the virtual trace log converter buffer 206-1 specifies the physical processor 101A, 101B, 101C, or 101D that was allocated to the virtual processor 148-1 (the virtual processor 148-1 that was dispatched to the physical processor) at the time indicated in the execute timestamp field 324. For example, a value of "A" in the physical processor identifier field 326 may specify the physical processor 101A and the value of "B" may specify the physical processor 101B, but in other embodiments any appropriate designation, identification, or index may be used.

The wait timestamp field 328 in the virtual trace log converter buffer 206-1 specifies the time that the virtual processor 148-1 started to wait, i.e., the beginning time at which the virtual processor 148-1 did not have an allocated physical processor (was not dispatched), so that the virtual processor 148-1 was waiting for an allocation of a physical processor to the virtual processor 148-1. In an embodiment, the wait timestamp field 328 stores time data in units of dates, days, years, hours, minutes, second, milliseconds, microseconds, any other appropriate dates, or any combination thereof.

The wait time delta field 330 in the virtual trace log converter buffer 206-1 specifies the amount of time during which the virtual processor 148-1 waited for an allocation of a physical processor, i.e., the amount of time that the virtual processor 148-1 waited to be dispatched to a physical processor.

The dispatch reason field 332 in the virtual trace log converter buffer 206-1 specifies the reason that the physical processor (indicated by the physical processor identifier 326) was allocated to the virtual processor 148-1 at the time indicated by the execute timestamp 324 and began executing the instructions of the logical partition 134-1 (i.e., the reason that the virtual processor 148-1 was dispatched at the execute time 324). An example dispatch reason (indicated by "preempt") is that the virtual processor 148-1 was dispatched after returning from a preempt condition, i.e., the virtual processor 148-1 was dispatched after having its allocation of a physical processor preempted by another virtual processor. Another example dispatch reason (indicated by "timeout") is that the virtual processor 148-1 is being dispatched to handle the expiration of a timer. Another example dispatch reason (indicated by "external interrupt") is that the virtual processor 148-1 is being dispatched to handle an external interrupt condition. Another example dispatch reason (indicated by "lpprod") is that the virtual processor 148-1 is being dispatched due to a request from the logical partition to force the virtual processor 148-1 to execute instructions of the logical partition, i.e., for the allocation of a physical processor to the virtual processor 148-1. Another example dispatch reason is that the virtual processor 148-1 is being dispatched due to another logical partition signaling an event to the virtual processor 148-1 in this partition. Another example dispatch reason is that the virtual processor 148-1 is being dispatched due to the completion of a page fault. Another example dispatch reason is that the virtual processor 148-1 is being dispatched to perform an initial program load or other initialization sequence within the partition. Another example dispatch reason is that the virtual processor 148-1 is being dispatched to handle the termination of the partition. Another example dispatch reason is that the virtual processor 148-1 is being dispatched due to the releasing of a block condition. In other embodiments, any reason for dispatching (allocating) virtual processors to physical processors may be used.

FIG. 3B depicts a block diagram of another example virtual trace log converter buffer 206-2, according to an embodiment of the invention. The virtual trace log converter buffer 206-2 is associated with the virtual processor 148-2, meaning that the virtual trace log converter buffer 206-2 includes an amalgamation of records that were copied from the wrapping virtual trace log 150-2 by way of the virtual trace log exporter buffer 140-1. The virtual trace log converter buffer 206-2 is associated with the partition 134-1, meaning that the virtual trace log converter buffer 206-2 includes records that describe the allocation of physical processor(s) 101 to the virtual processor 148-2, on which the programs of the partition 134-1 execute. The virtual trace log converter buffer 206-2 is an example of the virtual trace log converter buffer 206. The virtual trace log converter buffer 206-2 includes example records 340, 342, 344, 346, and 348, each of which includes an example execute timestamp field 324, a physical processor identifier field 326, a wait timestamp field 328, a wait time delta field 330, and a dispatch reason field 332.

The execute timestamp field 324 in the virtual trace log converter buffer 206-2 specifies the beginning time at which the virtual processor 148-2 was allocated a physical processor (by the hypervisor 136) and the programs (e.g., the exporter 146, extractor 144, operating system, and/or applications) of the logical partition 134-1 began executing on the virtual processor 148-2, i.e., the programs began executing on the physical processor allocated to the virtual processor 148-2. For each record in the virtual trace log converter buffer 206-2, the execute timestamp field 324 includes the sum of the contents of the wait timestamp field 328 and the contents of the wait time delta field 330 in the same record.

The physical processor identifier field 326 in the virtual trace log converter buffer 206-2 specifies the physical processor 101A, 101B, 101C, or 101D that was allocated to the virtual processor 148-2 at the time indicated in the execute timestamp field 324.

The wait timestamp field 328 in the virtual trace log converter buffer 206-2 specifies the time that the virtual processor 148-2 started to wait, i.e., the beginning time at which the virtual processor 148-2 did not have an allocated physical processor, so that the virtual processor 148-2 was waiting for an allocation of a physical processor to the virtual processor 148-2. In an embodiment, the wait timestamp field 328 stores data in units of dates, hours, minutes, second, milliseconds, microseconds, any other appropriate dates, or any combination thereof.

The wait time delta field 330 in the virtual trace log converter buffer 206-2 specifies the amount of time during which the virtual processor 148-2 waited for an allocation of a physical processor.

The dispatch reason field 332 in the virtual trace log converter buffer 206-2 specifies the reason that the physical processor (indicated by the physical processor identifier 326) was allocated to the virtual processor 148-2 at the time indicated by the execute timestamp 324 and began executing the instructions of the logical partition 134-1 (i.e., the reason that the virtual processor 148-2 was dispatched at the execute time 324).

FIG. 3C depicts a block diagram of another example virtual trace log converter buffer 206-3, according to an embodiment of the invention. The virtual trace log converter buffer 206-3 is associated with the virtual processor 148-3, meaning that the virtual trace log converter buffer 206-3 includes an amalgamation of records that were copied from the wrapping virtual trace log 150-3 by way of the virtual trace log exporter buffer 140-2. The virtual trace log converter buffer 206-3 is associated with the partition 134-2, meaning that the virtual trace log converter buffer 206-3 includes records that describe the allocation of physical processor(s) 101 to the virtual processor 148-3, on which the programs of the partition 134-2 execute. The virtual trace log converter buffer 206-3 is an example of the virtual trace log converter buffer 206. The virtual trace log converter buffer 206-3 includes example records 350, 352, 354, 356, and 358, each of which includes an example execute timestamp field 324, a physical processor identifier field 326, a wait timestamp field 328, a wait time delta field 330, and a dispatch reason field 332.

The execute timestamp field 324 in the virtual trace log converter buffer 206-3 specifies the beginning time at which the virtual processor 148-3 was allocated a physical processor (by the hypervisor 136) and the programs (e.g., the exporter 146, extractor 144, operating system, and/or applications) of the logical partition 134-2 began executing on the virtual processor 148-3, i.e., the programs began executing on the physical processor allocated to the virtual processor 148-3. For each record in the virtual trace log converter buffer 206-3, the execute timestamp field 324 includes the sum of the contents of the wait timestamp field 328 and the contents of the wait time delta field 330 in the same record.

The physical processor identifier field 326 in the virtual trace log converter buffer 206-3 specifies the physical processor 101A, 101B, 101C, or 101D that was allocated to the virtual processor 148-3 at the time indicated in the execute timestamp field 324.

The wait timestamp field 328 in the virtual trace log converter buffer 206-3 specifies the time that the virtual processor 148-3 started to wait, i.e., the beginning time at which the virtual processor 148-3 did not have an allocated physical processor, so that the virtual processor 148-3 was waiting for an allocation of a physical processor to the virtual processor 148-3. In an embodiment, the wait timestamp field 328 stores data in units of dates, hours, minutes, second, milliseconds, microseconds, any other appropriate dates, or any combination thereof.

The wait time delta field 330 in the virtual trace log converter buffer 206-3 specifies the amount of time during which the virtual processor 148-3 waited for an allocation of a physical processor.

The dispatch reason field 332 in the virtual trace log converter buffer 206-3 specifies the reason that the physical processor (indicated by the physical processor identifier 326) was allocated to the virtual processor 148-3 at the time indicated by the execute timestamp 324 and began executing the instructions of the logical partition 134-2 (i.e., the reason that the virtual processor 148-3 was dispatched at the execute time 324).

FIG. 3D depicts a block diagram of another example virtual trace log converter buffer 206-4, according to an embodiment of the invention. The virtual trace log converter buffer 206-4 is associated with the virtual processor 148-4, meaning that the virtual trace log converter buffer 206-4 includes an amalgamation of records that were copied from the wrapping virtual trace log 150-4 by way of the virtual trace log exporter buffer 140-2. The virtual trace log converter buffer 206-4 is associated with the partition 134-2, meaning that the virtual trace log converter buffer 206-4 includes records that describe the allocation of physical processor(s) 101 to the virtual processor 148-4, on which the programs of the partition 134-2 execute. The virtual trace log converter buffer 206-4 is an example of the virtual trace log converter buffer 206. The virtual trace log converter buffer 206-4 includes example records 370, 372, 374, 376, and 380, each of which includes an example execute timestamp field 324, a physical processor identifier field 326, a wait timestamp field 328, a wait time delta field 330, and a dispatch reason field 332.

The execute timestamp field 324 in the virtual trace log converter buffer 206-4 specifies the beginning time at which the virtual processor 148-4 was allocated a physical processor (by the hypervisor 136) and the programs (e.g., the exporter 146, extractor 144, operating system, and/or applications) of the logical partition 134-2 began executing on the virtual processor 148-4, i.e., the programs began executing on the physical processor allocated to the virtual processor 148-4. The execute timestamp field 324 includes the sum of the contents of the wait timestamp field 328 and the contents of the wait time delta field 330.

The physical processor identifier field 326 in the virtual trace log converter buffer 206-4 specifies the physical processor 101A, 101B, 101C, or 101D that was allocated to the virtual processor 148-4 at the time indicated in the execute timestamp field 324.

The wait timestamp field 328 in the virtual trace log converter buffer 206-4 specifies the time that the virtual processor 148-4 started to wait, i.e., the beginning time at which the virtual processor 148-4 did not have an allocated physical processor, so that the virtual processor 148-4 was waiting for an allocation of a physical processor to the virtual processor 148-4. In an embodiment, the wait timestamp field 328 stores data in units of dates, hours, minutes, second, milliseconds, microseconds, any other appropriate dates, or any combination thereof.

The wait time delta field 330 in the virtual trace log converter buffer 206-4 specifies the amount of time during which the virtual processor 148-4 waited for an allocation of a physical processor.

The dispatch reason field 332 in the virtual trace log converter buffer 206-4 specifies the reason that the physical processor (indicated by the physical processor identifier 326) was allocated to the virtual processor 148-4 at the time indicated by the execute timestamp 324 and began executing the instructions of the logical partition 134-2 (i.e., the reason that the virtual processor 148-4 was dispatched at the execute time 324).

FIG. 4A depicts a block diagram of an example physical trace log 138-1, according to an embodiment of the invention. The converter 205 creates the physical trace log 138-1 from the virtual trace log converter buffers 206-1, 206-2, 206-3, and 206-4, as further described below with reference to FIG. 6. The physical trace log 138-1 is associated with the physical processor 101A, which is denominated "A" in the physical processor identifier field 326 of the records of the virtual trace log converter buffers 206-1, 206-2, 206-3, and 206-4, of FIGS. 3A, 3B, 3C, and 3D, respectively. The physical trace log 138-1 may include records that describe the allocation of the physical processor A 101A to any virtual processor and to any partition. The physical trace log 138-1 is an example of the physical trace log 138.

The physical trace log 138-1 includes example records 402, 404, 406, 408, 410, 412, 414, and 416, each of which includes an example start timestamp field 430, a partition identifier field 432, a virtual processor identifier field 434, a dispatch reason field 436, a virtual processing time field 438, and a latency field 440. Each of the physical trace records describes a dispatch of one of the virtual processors to the physical processor A 101A. The dispatch may be for any virtual processor allocated to any partition.

The start timestamp field 430 in the physical trace log 138-1 specifies the beginning time at which the virtual processor (148-1, 148-2, 148-3, or 148-4) specified by the virtual processor identifier 434 was allocated the physical processor A 101A (by the hypervisor 136) and the programs (e.g., the exporter 146, extractor 144, operating system, and/or applications) of the logical partition 134-1 or 134-2 specified by the logical partition identifier 432 began executing on the virtual processor specified by the virtual processor identifier 434, i.e., the programs began executing on the physical processor A 101A allocated to the virtual processor.

The dispatch reason field 436 in the physical trace log 138-1 specifies the reason that the physical processor A 101A was allocated to the virtual processor specified by the virtual processor identifier 434 at the time indicated by the start timestamp 430 (i.e., the reason that the virtual processor specified by the virtual processor identifier 434 was dispatched at the start time 430.)

The virtual processing time field 438 in the physical trace log 138-1 specifies the amount of time for which the physical processor A 101A was allocated to the virtual processor specified by the virtual processor identifier 434 subsequent to the time indicated by the start timestamp 430. The latency field 440 indicates the amount of time after expiration of the virtual processing time 438 that the physical processor A 101A was not allocated to any virtual processor. Instead, the physical processor 101A is allocated to the hypervisor 136 for the latency time period 440. The latency time period 440 thus indicates the amount of overhead needed for the hypervisor 136 to dispatch the virtual processors. Thus, for each record in the physical trace log 138-1, the physical processor A 101A was allocated to the virtual processor 434 in the partition 432 starting at the start time 430, and that allocation continued for the virtual processing time period 438, after which the processor A was unallocated for the latency time period 440.

For example, as indicated in the record 402, the physical processor A 101A was allocated to the virtual processor A 148-1 in the partition A 134-1 starting at time "12301000" for a virtual processing time period 438 of "2000," after which the physical processor A 101A was unallocated to any virtual processor for a latency time period 440 of "10." The reason 436 for the allocation indicated in the record 402 is that the allocation of the physical processor A 101A was previously allocated to the virtual processor 434, but that allocation was preempted by an allocation of the physical processor A 101A to another virtual processor, and that allocation to the other virtual processor has now ended.

FIG. 4B depicts a block diagram of another example physical trace log 138-2, according to an embodiment of the invention. The converter 205 creates the physical trace log 138-2 from the virtual trace log converter buffers 206-1, 206-2, 206-3, and 206-4, as further described below with reference to FIG. 6. The physical trace log 138-2 is associated with the physical processor 101B, which is denominated "B" in the physical processor identifier field 326 of the records of the virtual trace log converter buffers 206-1, 206-2, 206-3, and 206-4 of FIGS. 3A, 3B, 3C, and 3D, respectively. The physical trace log 138-2 may include records that describe the allocation of the physical processor B 101B to any virtual processor and to any partition. The physical trace log 138-2 is an example of the physical trace log 138.

The physical trace log 138-2 includes example records 450, 452, 454, 456, 458, 460, 462, and 464, each of which includes an example start timestamp field 430, a partition identifier field 432, a virtual processor identifier field 434, a dispatch reason field 436, a virtual processing time field 438, and a latency field 440. Each of the physical trace records describes a dispatch of one of the virtual processors to the physical processor B 101B.

The start timestamp field 430 in the physical trace log 138-2 specifies the beginning time at which the virtual processor (148-1, 148-2, 148-3, or 148-4) specified by the virtual processor identifier 434 was allocated the physical processor B 101B (by the hypervisor 136) and the programs (e.g., the exporter 146, extractor 144, the operating system, and/or the applications) of the logical partition 134-1 or 134-2 specified by the logical partition identifier 432 began executing on the virtual processor specified by the virtual processor identifier 434, i.e., the programs began executing on the physical processor B 101B allocated to the virtual processor.

The dispatch reason field 436 in the physical trace log 138-2 specifies the reason that the physical processor B 101B was allocated to the virtual processor specified by the virtual processor identifier 434 at the time indicated by the start timestamp 430 (i.e., the reason that the virtual processor specified by the virtual processor identifier 434 was dispatched at the start time 430.)

The virtual processing time field 438 in the physical trace log 138-2 specifies the amount of time for which the physical processor B 101B was allocated to the virtual processor specified by the virtual processor identifier 434 subsequent to the time indicated by the start timestamp 430. The latency field 440 indicates the amount of time after expiration of the virtual processing time that the physical processor B 101B was not allocated to any virtual processor. Thus, for each record in the physical trace log 138-2, the physical processor B 101B was allocated to the virtual processor 434 in the partition 432 starting at the time 430, and that allocation continued for the virtual processing time period 438, after which the processor B 101B was unallocated for the latency time period 440.

For example, as indicated in the record 450, the physical processor B 101B was allocated to the virtual processor B 148-2 in the partition A 134-1 starting at time "12302000" for a virtual processing time period 438 of "1000," after which the physical processor B 101B was unallocated to any virtual processor for a latency time period 440 of "20." The reason 436 for the allocation indicated in the record 450 is that the virtual processor 148-1 is being dispatched to the physical processor B 101B to handle the expiration of a timer.

In an embodiment, the physical trace logs 138-1 and 138-2 may be used to determine if the physical processors are being used efficiently by the hypervisor 136 and partitions. For example, the physical trace logs 138-1 and 138-2 may be used to determine if a specific physical processor is executing for short durations (by examining the amounts of the virtual processing times 438) and switching allocations frequently between different logical partitions 432 and virtual processors 434 (by examining the sequence of values of the partitions 432 and the virtual processors 434 in the various records). In such a situation, the physical processor may be spending much of its cycles thrashing bringing memory contents into caches and storage directories without sufficient time remaining to perform useful work, resulting in degraded performance. The physical trace logs 138-1 and 138-2 may also be used to determine the overhead (latency) of the hypervisor during its dispatching of a virtual processor.

Determining if a physical processor is executing for short durations is difficult when examining only the virtual trace logs because their data is organized from the perspective of the virtual processors, so that the physical processor allocation information is spread across multiple virtual trace logs and because a single virtual trace log may specify allocations of a virtual processor to multiple physical processors. Determining the hypervisor latency is also difficult when examining only the virtual trace logs because they do not specify the hypervisor latency and because the information needed to determine they hypervisor latency may be spread over multiple records in multiple logs. This difficulty is exacerbated in computer systems with larger numbers of logical partitions and physical processors. For example, some computer systems may have 64 or more logical partitions and 32 or more processors. Using the physical trace logs is easier because a single physical trace log includes all allocation information for a single physical processor, including dispatches of multiple virtual processors for multiple partitions to the single physical processor represented by the physical trace log.

Figure 5:
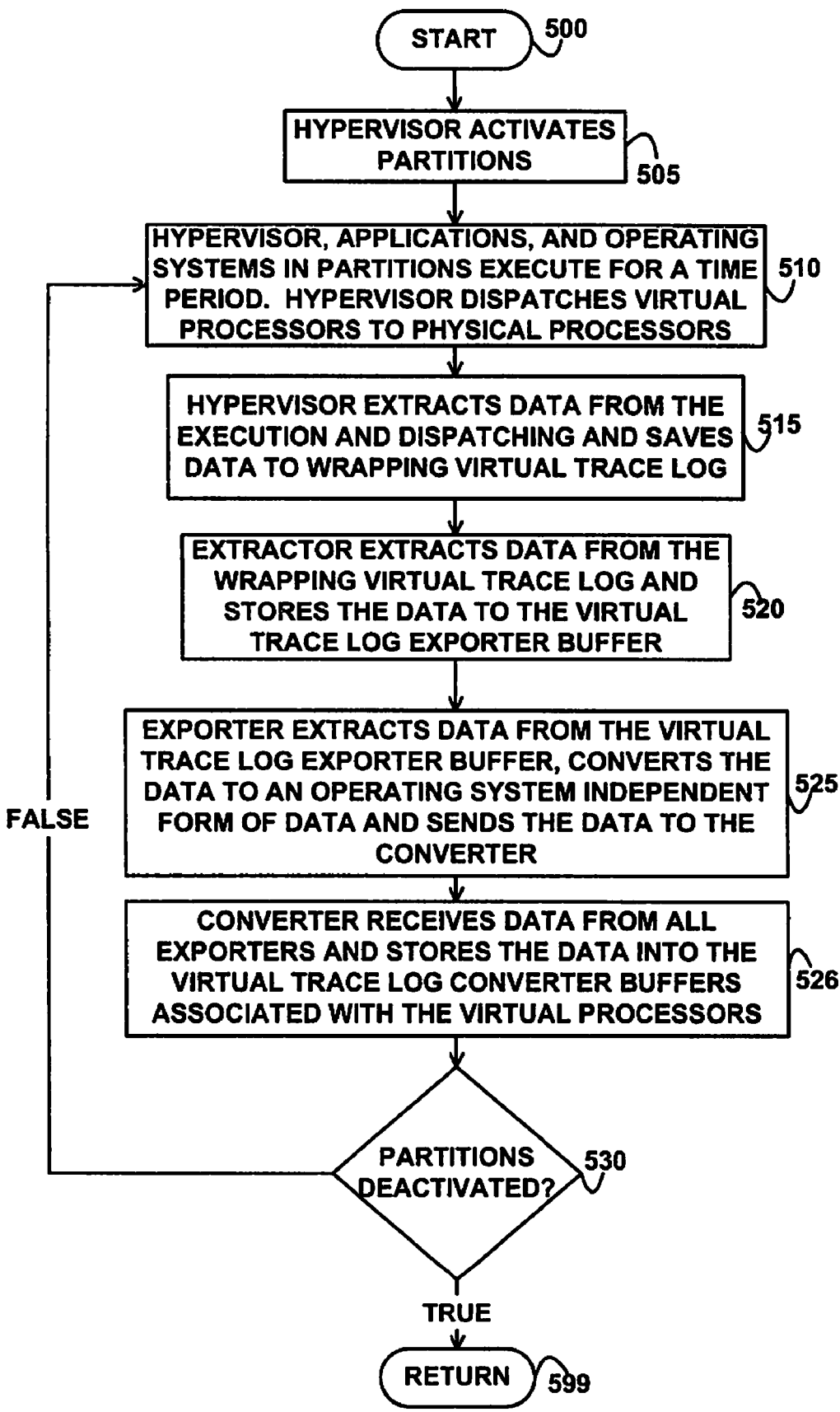
FIG. 5 depicts a flowchart of example processing for extracting and exporting data to a virtual trace log, according to an embodiment of the invention.

FIG. 5 depicts a flowchart of example processing for extracting and exporting data to a virtual trace log, according to an embodiment of the invention. Control begins at block 500. Control then continues to block 505 where the hypervisor 136 activates partitions. Activating a partition includes the hypervisor 136 allocating memory, virtual processors, and other resources to the partition, allocating a physical processor to at least one virtual processor (dispatching the virtual processor to the physical processor) used by the partition and starting execution of the operating system of the partition on the virtual processor (on the physical processor to which the virtual processor is dispatched).

Control then continues to block 510 where the applications and the operating systems of the activated partitions and the hypervisor 136 execute on various virtual and physical processors for a time period. The hypervisor 136 may change the allocation of physical processors to virtual processors during the time period because of the dispatch reasons 332 and 436, as previously described above.

Control then continues to block 515 where the hypervisor 136 extracts data from the dispatching of virtual processors to physical processors and from the execution of the programs of the partitions and saves the extracted data to the wrapping virtual trace logs 150. For example, in response to the hypervisor 136 deallocating a physical processor from a virtual processor, the hypervisor 136 creates a record in the wrapping virtual trace log 150 and stores the time of the deallocation in the wait timestamp. Later, in response to allocating a physical processor to that virtual processor (dispatching a virtual processor to a physical processor), the hypervisor 136 finds that most-recently added record and saves the wait time delta to the record, which indicates the amount of time between the deallocation and the subsequent allocation (the subsequent dispatch of the virtual processor to a physical processor). The hypervisor 136 further stores the reason that the virtual processor was dispatched and the identifier of the physical processor to which the virtual processor is now dispatched.

Control then continues to block 520 where the extractor 144 extracts the data from the wrapping virtual trace logs 150 (the records including the physical processor identifier, the wait timestamp, the wait time delta, and the dispatch reasons) and stores the extracted data to the virtual trace log exporter buffers 140-1 and/or 140-2. Control then continues to block 525 where the exporter 146 extracts (reads) data from the virtual trace log exporter buffers 140-1 and/or 140-2, converts the data into an operating system independent form and sends the data to the converter 205. Control then continues to block 526 where the converter 205 receives the data from the exporters 146 and writes the data (the physical processor identifier 326, the wait timestamp 328, the wait time delta 330, and the dispatch reason 332) to records in the virtual trace log converter buffers 206-1, 206-2, 206-3, and 206-4, associated with the respective virtual processors.

Control then continues to block 530 where the hypervisor 136 determines whether the partitions are deactivated. If the determination at block 530 is true, then the partitions are deactivated, so control continues to block 599 where the logic of FIG. 5 returns If the determination of block 530 is false, then the partitions are not deactivated, so control returns to block 510 where the application and operating system in the partitions continue to execute for another time period, as previously described above.

Figure 6:
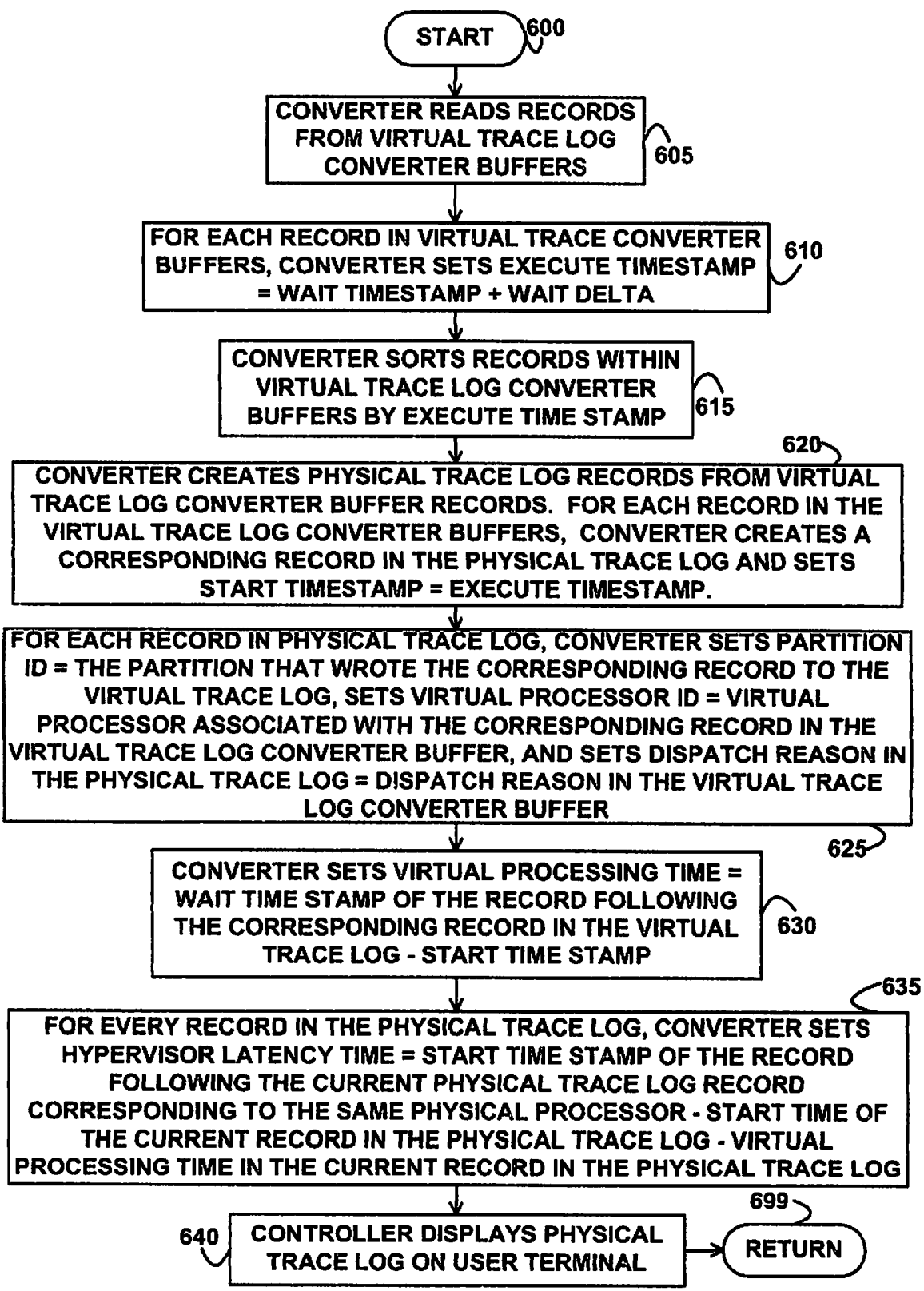
FIG. 6 depicts a flowchart of example processing for converting virtual trace logs to physical trace logs, according to an embodiment of the invention.

FIG. 6 depicts a flowchart of example processing for converting virtual trace logs to physical trace logs, according to an embodiment of the invention. In an embodiment, the converter 205 periodically performs the processing of FIG. 6. In another embodiment, the converter 205 performs the processing of FIG. 6 in response to receiving a request or command from the user terminal 121 or from a program.

Control begins at block 600. Control then continues to block 605 where the converter 205 reads the records from the virtual trace log converter buffers 206-1, 206-2, 206-3, and 206-4. Control then continues to block 610 where, for each record in the virtual trace log converter buffers 206-1, 206-2, 206-3, and 206-4, the converter 205 sets the execute timestamp 324 to be the associated wait timestamp 328 plus the associated wait time delta 330.

Control then continues to block 615 where the converter 205 sorts the records within the virtual trace log converter buffers 206-1, 206-2, 206-3, and 206-4 by the execute timestamp 324, ordering the records in the virtual trace log converter buffers 206-1, 206-2, 206-3, and 206-4 from the oldest execute timestamp to the newest execute timestamp.

Control then continues to block 620 where the converter 205 creates the physical trace log records from the virtual trace log converter buffer records. For each record in the virtual trace log converter buffers 206-1, 206-2, 206-3, and 206-4, the converter 205 selects a physical trace log that is associated with the physical processor whose identifier matches (is the same as) the physical processor identifier 326 in the record in the virtual trace log converter buffer. The converter 205 then creates a corresponding record in that selected physical trace log and sets the start timestamp 430 in the newly created physical trace log record to be the corresponding execute timestamp 324 from the virtual trace log converter buffer record. Thus, the converter 205 copies the execute timestamps to the records in the selected physical trace logs in the sorted order, so that the records in the selected physical trace logs are also sorted by the start timestamp 430, from the oldest time to the newest time.

For example, the record 302 in the virtual trace log converter buffer 206-1 has an execute timestamp 324 of "12301000" and a physical processor identifier 326 of "A," so the converter 205 selects the physical trace log 138-1 because it is associated with the physical processor A, whose identifier matches the physical processor identifier 326 of "A." The converter 205 then creates the record 402 in the selected physical trace log 138-1 and copies the execute timestamp 324 of "12301000" to the start timestamp 430 in the record 402.

Control then continues to block 625 where, for each record in the physical trace logs 138, the converter 205 sets the partition identifier 432 to be the partition whose extractor 144 wrote the corresponding record (the record whose execute timestamp matches the start timestamp) to the virtual trace log exporter buffer, sets the virtual processor identifier 434 to be the virtual processor associated with the corresponding record in the virtual trace log converter buffer, and sets the dispatch reason 436 to be the dispatch reason 332 in the corresponding record in the virtual trace log converter buffer. For example, the converter 205 sets the partition identifier 432 in the record 402 to "A" because the corresponding record 302 (in the virtual trace log converter buffer 206-1 from which the record 402 was created and whose execute timestamp 324 matches the start timestamp 430) was created as a result of the virtual processor owned by the partition "A" waiting for an allocation of a physical processor. Since the partition "A" waited, the extractor 144 in the partition "A" wrote the record 302 to the virtual trace log exporter buffer 140-1, which was subsequently converted and stored to the virtual trace log converter buffer 206-1. As a further example, the converter 205 copies the dispatch reason 332 of "preempt" from the corresponding record 302 to the dispatch reason 436 in the record 402.

Control then continues to block 630 where the converter 205 sets the virtual processing time period 438 to be the wait timestamp 328 of the record following (the next newest time) the corresponding record in the sorted virtual trace log converter buffer minus the start timestamp 430. For example, the record 302 in the virtual trace log corresponds to the record 402 in the physical trace log and the record 304 follows the record 302 in the sorted order in the virtual trace log converter buffer. Thus, the converter 205 sets the virtual processing time period 438 in the record 402 to "2000" because the wait timestamp 328 in the record 304 is "12303000," the start timestamp 430 in the record 402 is "12301000" and 12303000−12301000=2000.

Control then continues to block 635 where, for each record in the physical trace logs, the converter 205 sets the hypervisor latency time 440 to be the start timestamp 430 of the record following (the next newest time) the current physical trace log record corresponding to the same physical processor minus the start time 430 of the current record in the physical trace log minus the virtual processing time period 438 in the current record in the physical trace log. Explained another way, after the processing of block 635 completes for all the records in the physical trace log, the start timestamp 430 plus the virtual processing time period 438 plus the latency 440 in each record equals the start timestamp 430 of the subsequent record.

For example, the converter 205 sets the latency 440 in the record 402 to be the start time "12303010" of the next newest record 404 minus the start time "12301000" in the record 402 minus the virtual processing time "2000" in the record 402, which result is "10." Thus, the start time "12301000" plus the virtual processing time "2000" plus the latency "10" in the record 402 equals the start time "12303010" in the next newest record 404.

Control then continues to block 640 where the converter 205 optionally displays the physical trace log (in response to receiving a command) on the user terminal 121. In another embodiment, the converter 205 stores the physical trace log in memory or secondary storage or sends the physical trace log to a requesting program, e.g., an application 141-1 or 141-2 or to the server 132 via the network 130. Control then continues to block 699 where the logic of FIG. 6 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:

reading a plurality of virtual trace records that are associated with a plurality of virtual processors that are allocated to a plurality of logical partitions in a computer system, wherein each of the virtual trace records comprises an identifier of one of a plurality of physical processors to which the virtual processor was dispatched, a wait timestamp that specifies a time at which the virtual processor began waiting to be dispatched, and a wait time delta that specifies an amount of time that the virtual processor waited to be dispatched;

creating an execute timestamp in each of the virtual trace records, wherein the execute timestamp comprises a sum of the wait timestamp and the wait time delta from the virtual trace record;

sorting the plurality of virtual trace records for each of the plurality of virtual processors by the execute timestamp;

creating a plurality of physical trace records associated with the plurality of physical processors based on the plurality of virtual trace records, wherein each of the plurality of physical trace records describes a dispatch of one of the virtual processors to one of the physical processors, wherein the plurality of virtual processors represent fractional allocations of time slices of the plurality of physical processors, wherein each of the virtual trace records further comprises a dispatch reason that caused the virtual processor to be dispatched to the one of the plurality of physical processors, and wherein the creating the plurality of physical trace records further comprises copying the dispatch reason from the virtual trace record that comprises the identifier of the one of a plurality of physical processors to a corresponding one of the plurality of physical trace records that describes the dispatch of the one of the virtual processors to the one of the physical processors, wherein the creating the plurality of physical trace records further comprises creating a respective partition identifier in each of the plurality of physical trace records, wherein the partition identifier identifies the respective logical partition to which the respective virtual processor was allocated, wherein the creating the plurality of physical trace records further comprises creating a respective start timestamp in each of the plurality of physical trace records, wherein the respective start timestamp comprises a sum of the wait timestamp and the wait time delta from a corresponding record in the plurality of virtual trace records, wherein the corresponding record in the plurality of virtual trace records comprises the execute timestamp that is identical to the respective start timestamp in the plurality of physical trace records, wherein the creating the plurality of physical trace records further comprises creating a respective virtual processor identifier in each of the plurality of physical trace records, wherein the respective virtual process identifier identifies the respective virtual processor that was dispatched at the respective start timestamp, wherein the creating the plurality of physical trace records further comprises creating a respective current virtual processing time in each of the plurality of physical trace records, wherein the respective current virtual processing time specifies an amount of time for which the plurality of physical processors were allocated to the plurality of virtual processors specified by the virtual processor identifier subsequent to a time indicated by the respective start timestamp, wherein the respective current virtual processing time comprises the wait timestamp of a next virtual trace record that follows a current virtual trace record in time, wherein the current virtual trace record corresponds to a current physical trace record, minus the start timestamp of the current physical trace record; and displaying the plurality of physical trace records.

2. The method of claim 1, wherein the creating the plurality of physical trace records further comprises:

creating a respective latency time in each of the plurality of physical trace records, wherein the respective latency time amount in the current physical trace record comprises a next start timestamp in a next physical trace record minus the start timestamp of the current physical trace record minus the current virtual processing time.

3. A storage medium encoded with instructions, wherein the instructions when executed comprise:

reading a plurality of virtual trace records that are associated with a plurality of virtual processors that are allocated to a plurality of logical partitions, wherein each of the virtual trace records comprises an identifier of one of a plurality of physical processors to which the virtual processor was dispatched, a wait timestamp that specifies a time at which the virtual processor began waiting to be dispatched, and a wait time delta that specifies an amount of time that the virtual processor waited to be dispatched;

creating an execute timestamp in each of the virtual trace records, wherein the execute timestamp comprises a sum of the wait timestamp and the wait time delta;

sorting the plurality of virtual trace records for each of the plurality of virtual processors by the execute timestamp;

creating a plurality of physical trace records associated with the plurality of physical processors based on the plurality of virtual trace records, wherein each of the plurality of physical trace records describes a dispatch of one of the virtual processors to one of the physical processors, wherein the plurality of virtual processors represent fractional allocations of time slices of the plurality of physical processors, wherein each of the virtual trace records further comprises a dispatch reason that caused the virtual processor to be dispatched to the one of the plurality of physical processors, and wherein the creating the plurality of physical trace records further comprises copying the dispatch reason from the virtual trace record that comprises the identifier of the one of a plurality of physical processors to a corresponding one of the plurality of physical trace records that describes the dispatch of the one of the virtual processors to the one of the physical processors, wherein the creating the plurality of physical trace records further comprises creating a respective partition identifier in each of the plurality of physical trace records, wherein the partition identifier identifies the respective logical partition to which the respective virtual processor was allocated, wherein the creating the plurality of physical trace records further comprises creating a respective start timestamp in each of the plurality of physical trace records, wherein the respective start timestamp comprises a sum of the wait timestamp and the wait time delta from a corresponding record in the plurality of virtual trace records, wherein the corresponding record in the plurality of virtual trace records comprises the execute timestamp that is identical to the respective start timestamp in the plurality of physical trace records, wherein the creating the plurality of physical trace records further comprises creating a respective virtual processor identifier in each of the plurality of physical trace records, wherein the respective virtual process identifier identifies the respective virtual processor that was dispatched at the respective start timestamp, wherein the creating the plurality of physical trace records further comprises creating a respective current virtual processing time in each of the plurality of physical trace records, wherein the respective current virtual processing time specifies an amount of time for which the plurality of physical processors were allocated to the plurality of virtual processors specified by the virtual processor identifier subsequent to a time indicated by the respective start timestamp, wherein the respective current virtual processing time comprises the wait timestamp of a next virtual trace record that follows a current virtual trace record in time, wherein the current virtual trace record corresponds to a current physical trace record, minus the start timestamp of the current physical trace record; and displaying the plurality of physical trace records.

4. The storage medium of claim 3, wherein the creating the plurality of physical trace records further comprises:

creating a respective latency time in each of the plurality of physical trace records, wherein the respective latency time in the current physical trace record comprises a next start timestamp in a next physical trace record minus the start timestamp of the current physical trace record minus the current virtual processing time.

5. A computer system comprising:

a processor; and memory connected to the processor, wherein the memory encodes instructions that when executed by the processor comprise:

reading a plurality of virtual trace records that are associated with a plurality of virtual processors that are allocated to a plurality of logical partitions, wherein each of the virtual trace records comprises an identifier of one of a plurality of physical processors to which the virtual processor was dispatched, a wait timestamp that specifies a time at which the virtual processor began waiting to be dispatched and a wait time delta that specifies an amount of time that the virtual processor waited to be dispatched, creating an execute timestamp in each of the virtual trace records, wherein the execute timestamp comprises a sum of the wait timestamp and the wait time delta, sorting the plurality of virtual trace records for each of the plurality of virtual processors by the execute timestamp, creating a plurality of physical trace records associated with the plurality of physical processors based on the plurality of virtual trace records, wherein each of the plurality of physical trace records describes a dispatch of one of the virtual processors to one of the physical processors, wherein the plurality of virtual processors represent fractional allocations of time slices of the plurality of physical processors, wherein each of the virtual trace records further comprises a dispatch reason that caused the virtual processor to be dispatched to the one of the plurality of physical processors, and wherein the creating, the plurality of physical trace records further comprises copying the dispatch reason from the virtual trace record that comprises the identifier of the one of a plurality of physical processors to a corresponding one of the plurality of physical trace records that describes the dispatch of the one of the virtual processors to the one of the physical processors, wherein the creating the plurality of physical trace records further comprises creating a respective partition identifier in each of the plurality of physical trace records, wherein the partition identifier identifies the respective logical partition to which the respective virtual processor was allocated, wherein the creating the plurality of physical trace records further comprises creating a respective start timestamp in each of the plurality of physical trace records, wherein the respective start timestamp comprises a sum of the wait timestamp and the wait time delta from a corresponding record in the plurality of virtual trace records, wherein the corresponding record in the plurality of virtual trace records comprises the execute timestamp that is identical to the respective start timestamp in the plurality of physical trace records, wherein the creating the plurality of physical trace records further comprises creating a respective virtual processor identifier in each of the plurality of physical trace records, wherein the respective virtual process identifier identifies the respective virtual processor that was dispatched at the respective start timestamp, wherein the creating the plurality of physical trace records further comprises creating a respective current virtual processing time in each of the plurality of physical trace records, wherein the respective current virtual processing time specifies an amount of time for which the plurality of physical processors were allocated to the plurality of virtual processors specified by the virtual processor identifier subsequent to a time indicated by the respective start timestamp, wherein the respective current virtual processing time comprises the wait timestamp of a next virtual trace record that follows a current virtual trace record in time, wherein the current virtual trace record corresponds to a current physical trace record,, minus the start timestamp of the current physical trace record, and displaying the plurality of physical trace records.

6. The computer system of claim 5, wherein the creating the plurality of physical trace records further comprises:

creating a respective latency time in each of the plurality of physical trace records, wherein the respective latency time in the current physical trace record comprises a next start timestamp in a next physical trace record minus the start timestamp of the current physical trace record minus the current virtual processing time.

* * * * *